Sept. 20, 1960 W. C. DERSCH 2,953,231

AUTOMATIC OPTICAL TABULATING SYSTEM

Filed April 24, 1959 4 Sheets-Sheet 1

INVENTOR.
WILLIAM C. DERSCH

BY

Walter J. Madden, Jr.

ATTORNEY

United States Patent Office 2,953,231

Patented Sept. 20, 1960

2,953,231

AUTOMATIC OPTICAL TABULATING SYSTEM

William C. Dersch, Los Gatos, Calif., assignor to International Business Machines Corporation, New York, N.Y., a corporation of New York Filed Apr. 24, 1959, Ser. No. 808,775

7 Claims. (Cl. 197—176)

This invention relates in general to automatic tabulating systems and relates more particularly to an automatic tabulating system for typewriters and the like.

The tabulation of typewriters generally in use today is accomplished by manually setting the tab stops prior to a typing operation. The preparation of different documents often requires different tabulation patterns, thus necessitating that the tab stops be reset by the typist prior to each different typing operation. In U.S. Patent No. 2,860,759, assigned to the same assignee as the present application, there is disclosed an automatic tabulating mechanism in which the document on which the typing is to be done is provided with sensible conductive marks whose positions on the document correspond to the desired positions of the tab stops. These marks are sensed by a transducer located on the typewriter, and the transducer output controls the carriage positioning mechanism so as to position the carriage with one of the sensible marks adjacent the printing station of the typewriter. The above apparatus produces automatic tabulation of a typewriter or similar instrument and eliminates the need for the typewriter operator to reset the tab stops for each of the different tab settings on the material being typed by making use of a worksheet provided with sensible marks for controlling the carriage positioning.

The present invention contemplates an automatic tabulating system for typewriters and the like, in which optical means are utilized to control the tabulation operation. In general, optical tabulation systems present many difficulties, owing to such factors as variations in the ambient light of the vicinity of the optical sensing equipment, variations in the contrast between the marks to be sensed and the background of the document, and the similarity of the marks to be sensed to other characters and indicia on the document. In accordance with the present invention, the tab stop marks are placed on the document at positions corresponding to the desired tab stops and are in the form of lines having a predetermined width and having a light reflection coefficient different from that of the document itself. These lines are sensed by means of a pair of adjacent beams of light which are directed at the document and which are reflected therefrom by varying amounts in dependence upon whether the light beams strike the background material of the document or the tab stop marks. The total width of the two adjacent light beams is such that the beams completely cover a tab stop mark when one of the marks is opposite the beams. The widths of the beams and the tab stop mark are also such that no other marks or indicia on the document have sufficient width to cover the projected beams.

A portion of the light from each of the projected beams is reflected back to separate light detection circuits which produce output pulses when they detect variations in the amount of reflected light received. These two light detecting circuits are connected to a coincidence detection network which produces an output pulse only when there is a simultaneous reduction in light detected by both of the two light detecting elements. The coincidence circuit thus receives simultaneous input pulses only when one of the tab stop marks of a predetermined width is positioned adjacent both the projected light beams. The output from the coincidence circuit is then utilized to control the carriage positioning mechanism to arrest the carriage at the desired tab stop position. Thus, other factors which might cause variations in the amount of light reflected from the document, such as variations in the contrast between the document and the printed matter thereon, or marks or characters on the document such as the vertical portion of the letter "E," having widths less than the width of the tab stop marks, are ineffective to produce the coincident pulses to the coincidence detection circuit, and are thus ineffective to operate the tab positioning mechanism. It should be noted that the tab stop marks may be printed with the same ink used in printing the other information on the document, provided this ink is sufficiently dark to produce the desired contrast.

In the preferred form of the present invention, the light directing means are in the form of "light pipes" which act to separately guide the light beams from the light source to the document. As is well known, these light pipes, which may be made of "Lucite" or other similar material, act to guide light therethrough, and the path of the light bends to follow curvatures or other angles in the light pipe. As an additional feature of the present invention, the light transmitting and receiving structure is so designed that a portion of the light from the light source is supplied to the light sensitive devices in the form of a biasing light. By thus supplying a portion of the light from the light source directly to the light sensitive cells, the effective circuit sensitivity of the cells is reduced, thereby reducing the effective noise signal from the ambient light. Since the signal-to-noise ratio resulting from the light pickup from the document is independent of the actual intensity of the light and is dependent only upon the contrast, the effective signal-to-noise ratio is increased by increasing the biasing light. Thus, the use of the biasing light results in optimizing the effective signal-to-noise ratio in the optical system. Addtionally, the use of the biasing light acts as a negative feedback to stabilize the output of the light sensitive cells, thus further aiding the above describing increase in signal-to-noise ratio. That is, if the amount of light transmitted from the light source to the document is increased, this results in a larger difference in the amount of light reflected back to the light sensitive cells, due to the difference in contrast between the tab stop marks and the paper background, thus tending to vary the signal output from the photocells. However, since the biasing effect causes more biasing light from the light source to fall on the light sensitive cells and thereby decrease their circuit sensitivity, the output signals from the cells are fairly constant and independent of wide variations in the intensity of the light source. This negative feedback minimizes the aging effect of the light source, thus producing substantially uniform operation of the device over the life of the light source.

It is therefore an object of the present invention to provide an improved automatic tabulating system for typewriters and the like.

It is an additional object of the present invention to provide an improved optical tabulating mechanism which is fully automatic and which requires no presetting of the tab stops.

It is a further object of the present invention to provide an automatic tabulating system for a typewriter utilizing an optical mechanism adapted to sense tab stop marks of a predetermined width recorded on a document to be typed, the sensing mechanism including a pair of light sensitive elements having an effective width approximately equal to the width of the tab stop marks so that coincident pulses are produced from the two light sensitive elements only when a tab stop mark is adjacent these elements.

It is a further object of the present invention to provide an automatic tabulating system which does not require the use of a multiplicity of types and/or colors of ink to differentiate the tab stop marks from other information on the document.

It is a further object of the present invention to provide an automatic tabulating system for typewriters utilizing a light source for projecting light toward tab stop marks on a document and detecting the light reflected from the document by means of a pair of photocells, in which a portion of the light from the light source is supplied directly to the photocells to bias these photocells a predetermined amount.

Other objects of the invention will be pointed out in the following description and claims and illustrated in the accompanying drawings which disclose, by way of example, the principle of the invention and the best mode which has been contemplated of applying that principle.

Figure 1:
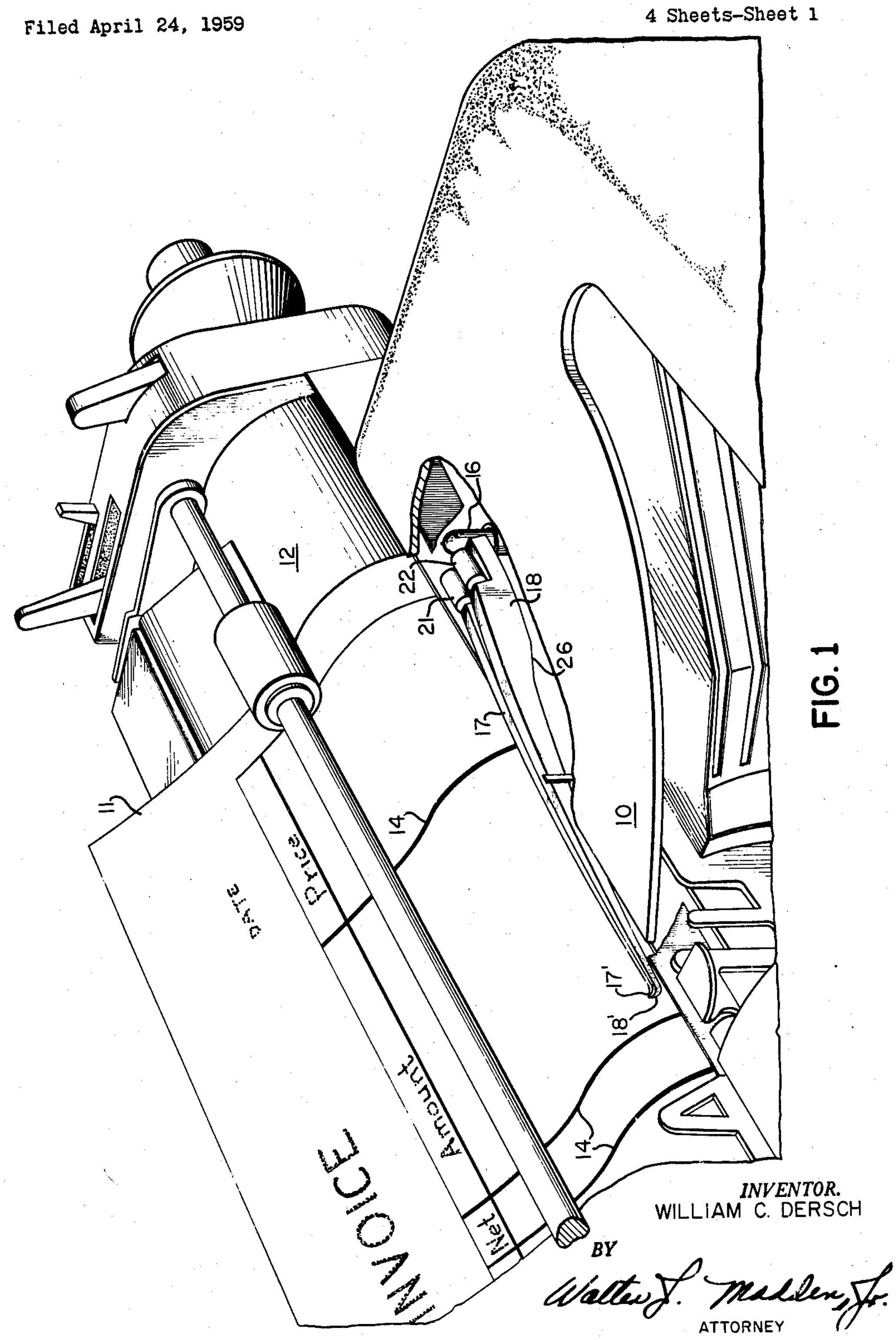
Fig. 1 is a perspective view of a portion of a typewriter equipped with the novel optical tabulating system of the present invention.

As illustrated in Fig. 1, a typewriter 10 is provided with an automatic tabulating system whereby tabulating is under the control of information recorded in the form of sensible marks on a document worksheet 11. Document 11 is inserted in the typewriter carriage 12, and the present invention is operative to position the carriage and different portions of the document 11 at a printing station. Document 11 is provided with sensible tab stop marks 14 whose positions on the sheet correspond to the desired tab stop positions. Tab stop marks 14 may be of any suitable type capable of being optically sensed in accordance with the present invention. For example, marks 14 may be lines having a predetermined width in accordance with the requirements of the present invention and being darker than the general background of the document 11 so as to reflect less light than the document surface. Tab stop marks 14 may also conveniently serve as visual dividers in the different areas of the document, to thus serve the double function of tab stop marks and lines of visual demarcation between different areas of the worksheet. It will be understood that tab stop marks 14 may be printed on the document at the same time the remainder of the information is printed, the only requirement being that the tab stop marks 14 have a width greater than any other indicia which is either printed on the document or which will subsequently be typed on the document.

Figure 2:
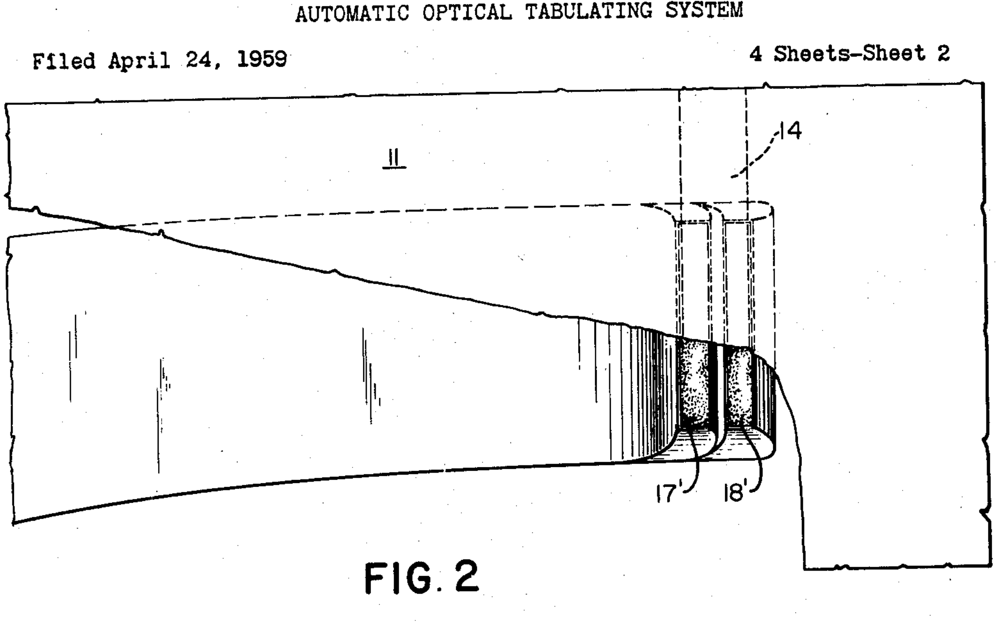
Fig. 2 is a view on an enlarged scale of the optical sensing means for directing the light at the worksheet.

Tab stop marks 14 are sensed by means of light which is projected from a light source 16 through a pair of bilateral "light pipes" or light guides 17, 18 which direct the light from source 16 in two separate paths along the front of document 11. Light pipes 17 and 18 are provided at their respective ends with what may be termed nozzle portions 17' and 18' which extend at approximately right angles to portions 17 and 18 and which are provided with slits at their ends for directing the light beams onto document 11. In practice, these slits may be formed by tapering the widths of the ends 17', 18' into a narrow cross-section to produce slits of the desired width. As shown in Fig. 2, the slits 17', 18' are adjacent each other and extend in the direction of carriage movement. Light from source 16 travels along the lengths of members 17 and 18, and is bent around the corners of these members and then passes out the narrow ends of members 17', 18' where it is projected onto document 11. Some of this projected light will be reflected from document 11 and will reenter the ends of members 17', 18' and travel as separate beams along paths through members 17 and 18 to a pair of light sensitive elements in the form of photocells 21 and 22. Photocell 21 is associated with light pipe 17, while photocell 22 is associated with light pipe 18. The output signals from photocells 21 and 22 are separately supplied to suitable circuitry for detecting coincidence of pulses on photocells to control the carriage positioning mechanism, as will be described more fully below.

From Fig. 2 it will be seen that the width of tab stop mark 14 in relation to the combined widths of slits 17', 18' is such that the two slits completely cover a tab stop mark 14 when the tab stop mark is positioned immediately adjacent the slits. At this time, the reduction in light reflection from tab stop mark 14 is the same for both slits 17', 18', thus producing substantially equal reduction in the amounts of reflected light returning to photocells 21 and 22. Photocells 21, 22 are connected so as to produce a minimum output signal when they are receiving a maximum amount of reflected light (as will be explained more fully below). Thus, a reduction in the amount of reflected light reaching cells 21 and 22 produces an increase in the photocell voltage outputs. The presence of a mark 14 opposite slits 17', 18' therefore produces coincident output pulses from these photocells. When slits 17', 18' are opposite any part of the document 11 other than a tab stop mark 14, slits 17', 18' either receive different amounts of reflected light so that there are no coincident pulses from photocells 21, 22 or, if the slits are opposite an unprinted area of the document so that both slits receive the same large amount of reflected light, the outputs of the photocells are not sufficient to actuate the coincident detection circuit. This prevents operation of the tab stop mechanism in response to either those areas of the document having printed matter with lines of a width less than tab stop marks 14, or those areas having no printing.

Figure 3:
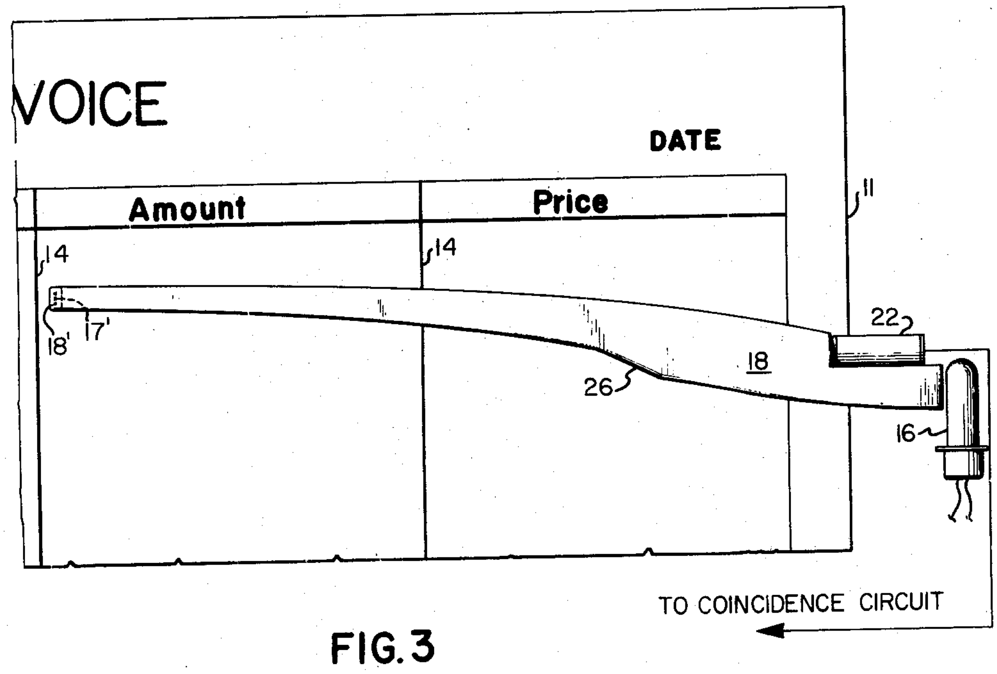
Fig. 3 is an elevation view illustrating the stopping of the typewriter carriage in response to a sensed tab stop mark.
Figure 4:
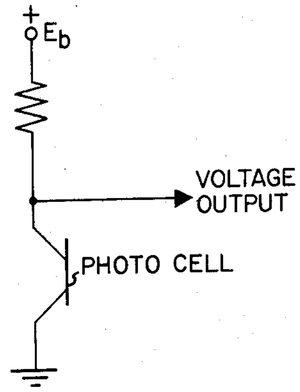
Fig. 4 is a diagram representing one method of connecting the photocells in the present invention.
Figure 5:
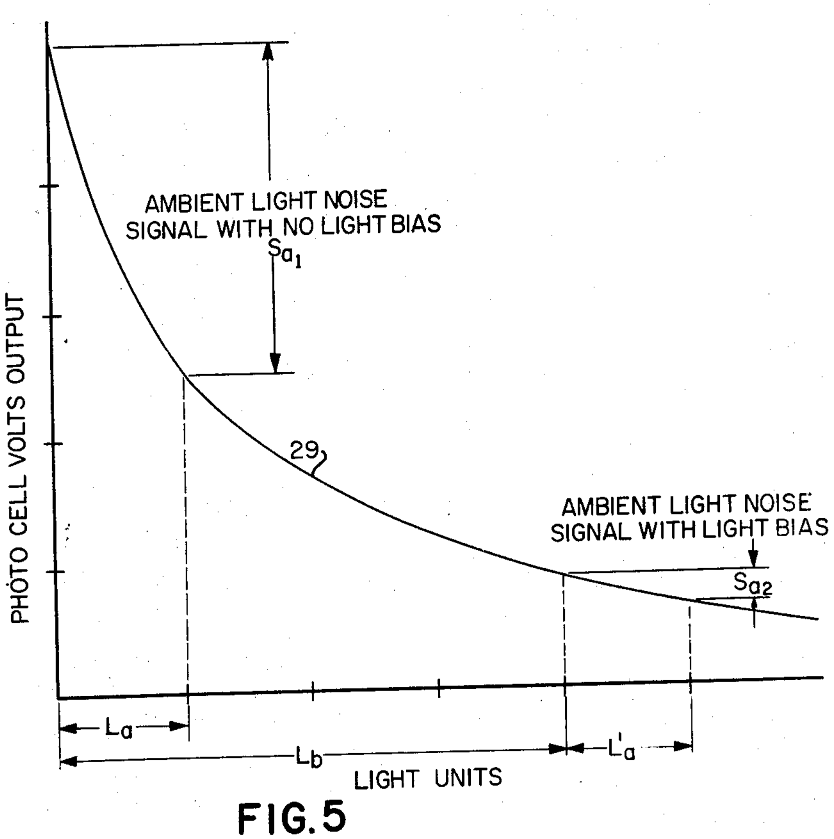
Fig. 5 is a graph illustrating the characteristics of the photocell circuit and the effects thereon of the light biasing of the present invention.

The portion of members 17 and 18 adjacent light source 16 and photocells 21 and 22 is provided with a biasing surface 26 (Fig. 3) which serves to reflect or divert a portion of the light from lamp 16 to photocells 21 and 22. Biasing surface 26 may be a surface as shown which is disposed at a suitable angle so as to diffuse and/or reflect some of the light from source 16 back toward photocells 21 and 22. One effect of this biasing light from source 16 is to reduce the effective sensitivity of photocells 21 and 22 so that the effect of the ambient light noise is reduced. This effect is shown in the graph of Fig. 5 where curve 29 represents the voltage output characteristics of photocells 21 and 22 as a function of the light input. Each of the photocells is preferably connected as shown in Fig. 4, so that the voltage output therefrom is a maximum with minimum light input to the cell, and the output decreases as the light input increases.

In the absence of a light bias in accordance with the present invention, a given amount of ambient light $L_a$ produces an ambient light noise signal $S_a$ having a substantial magnitude. However, when a light bias having a magnitude represented by $L_b$ is supplied to the photocells in accordance with the present invention, the effective operating point of the photocells is shifted to the portion of curve 29 having considerably less slope than the initial part of the curve. Therefore, with the photocells operating with a light bias represented by $L_b$, the given amount of ambient light $L'_a$ (which is equal to the ambient light $L_a$) produces an ambient light noise signal $S_{a2}$. The ambient light noise signal $S_{a2}$ is considerably smaller than the ambient light noise signal $S_{a1}$ which is produced when no light biasing is used. The use of the light bias in the present invention thus reduces the effective sensitivity of the photocells to decrease the effect of ambient light noise. However, since the signal-to-noise ratio resulting from the contrast light pickup from document 11 is dependent only on the contrast and is independent of the actual intensity of the light, the signal magnitude is not reduced to the same extent as the noise by the use of the biasing light, thus improving the effective signal-to-noise ratio.

The use of the biasing light and biasing surface also produces a negative feedback to stabilize the output of the photocells, and this action complements the above described action of reducing the signal-to-noise ratio. That is, if the light transmitted from source 16 to document 11 is increased, there will be a difference in the larger amount of light reflected from the document back to the photocells, due to the tab mark contrast, tending to vary the output of the photocells. However, the same increase in light transmisison to the document also results in an increase in biasing light transmission to the photocells, thus decreasing the photocell sensitivity so that the voltage output signals from the photocells remain fairly constant and independent of large variations in intensity of the light source. This negative feedback is particularly effective in minimizing the aging effect of the light source.

The effect of ambient light can be greatly minimized by the proper choice of light sensitive cells. Blue-sensitive light cells, such as the cadmium selenide type, are greatly affected by ambient light due to sunlight or fluorescent lights, and considerable shielding is necessary for proper operation of these cells. However, I have found that the lead sulphide-type light sensitive cells, such as the "Ektron" type, having their sensitivity peak in the infrared region, together with an incandescent bulb operating at reduced voltage and thereby having a dull red glow on the filament, produced a system almost totally insensitive to ambient light. Although good practice dictates at least nominal shielding of the optical system, the above infrared system operated successfully without any adjustment system whatsoever, both when exposed directly to a combination of sunlight, strong incandescent lights and strong fluorescent lamps and then in a deeply shaded room.

Figure 7:
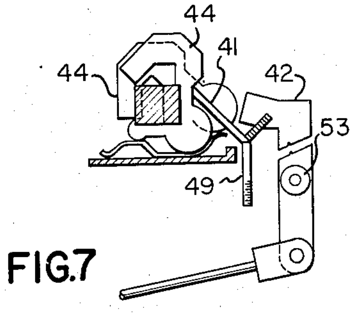
Fig. 7 is a partial sectional view taken along the line 7—7 of Fig. 6.
Figure 8:
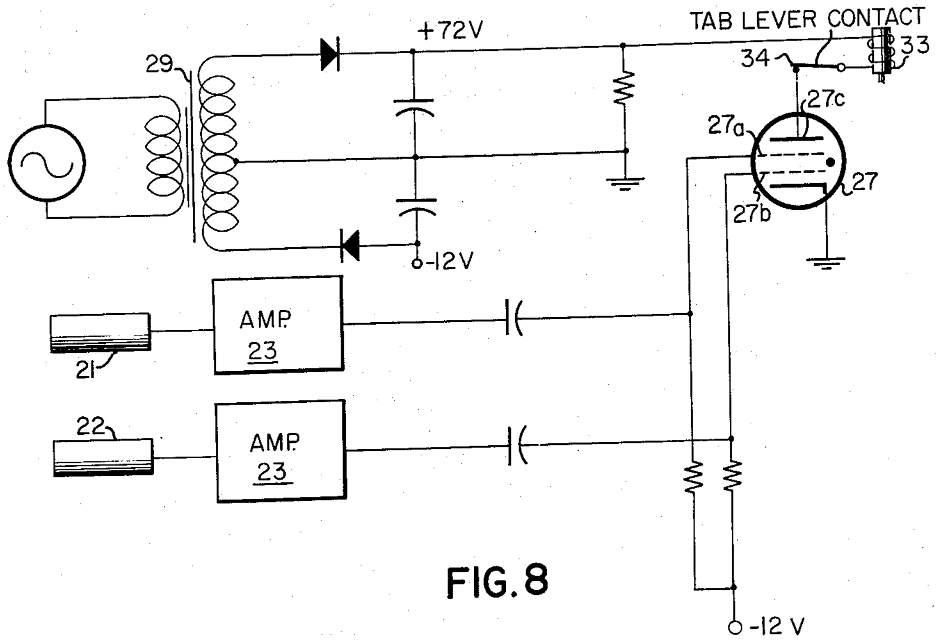
Fig. 8 is a schematic diagram of electrical circuitry for controlling the automatic tabulating in accordance with the present invention.

Figs. 7 and 8 illustrate circuitry and apparatus suitable for providing control of the positioning of the carriage 12 in response to sensing of marks 14. As shown in Fig. 8, the output signals from photocells 21, 22 may be supplied through a pair of amplifiers 23 to the control grids 27*a*, 27*b* of thyratron 27. Thyratron 27 is so biased that it requires the appearance of positive pulses on both of grids 27*a*, 27*b* to cause the tube to conduct, thus acting as a two-input AND gate. Power is supplied to thyratron 27 from a source 28 through a transformer 29. The anode 27*c* of thyratron 27 is connected to the winding of a solenoid 33 through a set of contacts 34 which are actuated by the typewriter tab set lever. When contact 34 is closed, thyratron 27 is connected through solenoid 33 to the power supply represented by transformer 29. The appearance of positive pulses on control grids 27*a*, 27*b* of the thyratron causes the thyratron to conduct, to thus produce current flow through the closed contact 34 and solenoid 33. When the typewriter carriage is stopped due to the action of energized solenoid 33, contact 34 is opened and the plate supply current to thyratron 27 is interrupted, thereby deenergizing solenoid 33 and the thyratron, so that the thyratron is not operative to conduct again until the next simultaneous appearance of pulses on control grids 27*a* and 27*b*. It will be appreciated that contact 34 is held open by suitable means (not shown) to disable the thyratron during the carriage return operation to prevent the marks sensed by photo-cells 21, 22 during the carriage-return operation from actuating solenoid 33.

Solenoid 33 (Fig. 6) is suitably supported by a bracket 43 on the rear portion of the frame of the typewriter, and is operative to control the setting of tab stops, when energized. The disclosed typewriter is provided with a well known tabulating mechanism of the type disclosed in U.S. Letters Patent No. 1,935,436, issued to C. W. Crumrine, in which displaced tab stop 44 engages a tabulating lever (not shown herein) to effect stoppage of the carriage after it has been placed in motion by actuation of the tabulation key. It is common practice to reset tab stops as desired by actuating a "tab set" key on the keyboard which is arranged with suitable linkage to displace the tab stop in a counterclockwise direction, as viewed in Fig. 7, to its "set" position. When set, the tab stop is placed in position to engage the tab lever if the tab lever has been actuated. (It should be noted that unless the tab key is actuated, the tab lever is in an inoperative position and will not engage displaced or set tab stops; however, when the tab key is actuated, the tab lever is moved into position to engage set tab stops. After engagement with the tab stop, the tab lever is reset to its inoperative position until the tab key is again actuated.)

Solenoid 33 (Fig. 6), as mentioned earlier, is provided to set the tab stops under the control of marks sensed on the master sheet 11. A flange 46, formed integrally with the armature 47 of solenoid 33, is journaled on a shaft 48 suitably secured to the frame of the typewriter in such a way that armature 47 is free to pivot about shaft 48 within established limits, the limits being determined by the solenoid itself and by a stop 49 bolted to the typewriter frame. Armature 47 is resiliently urged by a spring 50 against stop 49 and away from solenoid 33, and is so arranged that when the solenoid is energized, the pointed tab-stop-set end 51 thereof engages and displaces the tab stop 44 next adjacent thereto.

Figure 6:
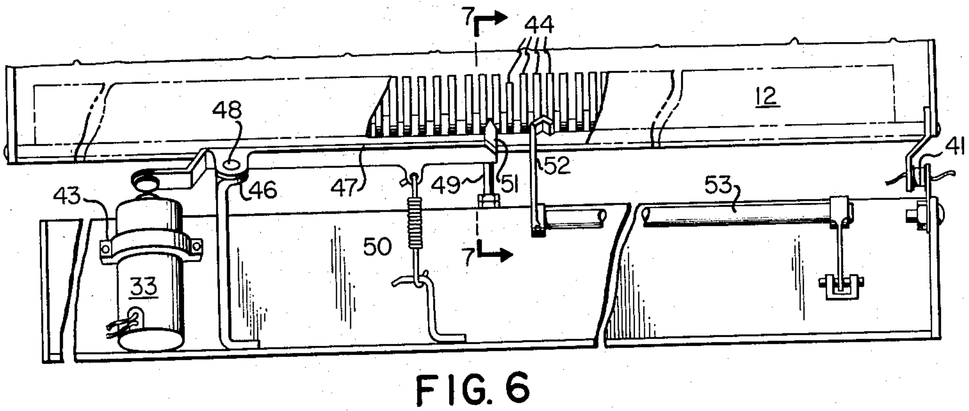
Fig. 6 is a partial rear elevation of the typewriter shown in Fig. 1 and illustrates the tab setting and resetting mechanism.

In many instances, tab stops such as those disclosed herein are reset by a bracket similar to a bracket 52 shown in Fig. 6, it being necessary for the operator to actuate a tab clear key on the keyboard, which is operative through suitable linkage to pivot bracket 52 about a shaft 53 to thereby swing the displaced tab stop in a clockwise direction to its normal or reset position. In the present embodiment, bracket 52 has a similar function; however, it is additionally arranged to cam displaced tab stops into their reset position when such stops laterally engage the pivoted bracket. When utilizing the automatic tabulation operation of the invention, it is preferable to reset the tab stops immediately after use, and means (not shown), such as a shift lock found on most typewriters in use today, is provided for maintaining the reset bracket in its actuated position during this operation. In this way bracket 52 is operative to reset all displaced tab stops as they are engaged by this bracket during the travel of the carriage and the tab stops.

When utilizing the automatic tabulation operation, the typist first actuates the tab clear key in such a way that bracket 52 is locked in its operative or reset position. Next, the tab key is actuated, which moves the tab lever into its operative position as well as frees the carriage to slide to the left, as viewed in Fig. 1. Actuation of the tab key also closes switch 34 in the circuit of solenoid 33 and the plate circuit of thyratron 27 (Fig. 8). When photocells 21, 22 sense a mark on the sheet then inserted in the typewriter, positive pulses are supplied from photocells 21, 22 to grids 27*a*, 27*b* thereby firing thyratron 27 and energizing solenoid 33. When this occurs, a tab stop is displaced, and when this tab stop engages the tab lever, the carriage is halted, as described in the aforementioned letters patent to Crumrine, that portion of the document inserted in the typewriter on which typing is to be done being disposed adjacent the printing station of the typewriter. Further movement of the carriage causes the displaced tab stop to be cammed or reset to its normal position. Additional automatic tabulation is accomplished in a similar manner. Thus, it is necessary only for the typist to insert a suitably programmed document 11 in the carriage of typewriter and then actuate the tab key to cause that portion of the document upon which typing is to be inserted to be positioned adjacent the printing station.

Thus, it will be seen that the apparatus of the present invention may be utilized to provide an automatic tabulating system for typewriters and the like, where the tabulating is under the control of the position of optically sensible marks provided on a sheet which is inserted in the carriage. Since the sensible marks do not require the use of conductive ink or other materials having electrical or magnetic properties, the sensible marks may be placed on the form at the time of its printing and may serve as visual dividers for the different areas of the document.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for controlling a typewriter carriage to position different portions of a document supported by said carriage at a printing station, said document having tab stop marks thereon whose positions correspond to tab stop positions, said tab stop marks having a width greater than the width of other indicia on said document and having a light reflection coefficient different from the general background of said document, comprising means for projecting two beams of light at said document, the combined width of said two beams of light being substantially the same as the width of one of the tab stop marks, means for detecing variations in the amount of light from said beams reflected from said document, means responsive to a simultaneous variation in the amounts of light reflected from both of said beams in response to a tab stop mark positioned opposite said beam-projecting means for producing a tab stop signal, and carriage positioning means responsive to said tab stop signal for positioning said carriage in accordance with sensed tab stop mark.

2. Apparatus for controlling a typewriter carriage to position different portions of a document supported by said carriage at a printing station, said document having tab stop marks thereon whose positions correspond to tab stop positions, said tab stop marks having a width greater than the width of other indicia on said document and having a light reflection coefficient different from the general background of said document, comprising means for projecting two beams of light at said document, the combined width of said two beams of light being substantially the same as the width of one of the tab stop marks, means for detecting variations in the amount of light from said beams reflected from said document, means responsive to a simultaneous reduction in the amounts of light reflected from both of said beams in response to a tab stop mark positioned opposite said beam-projecting means for producing a tab stop signal, and carriage positioning means responsive to said tab stop signal for positioning said carriage in accordance with said sensed tab stop mark.

3. Apparatus for controlling a typewriter carriage to position different portions of a document supported by said carriage at a printing station, said document having tab stop marks thereon whose positions correspond to tab stop positions, said tab stop marks having a width greater than the width of other indicia on said document and having a light reflection coefficient different from the general background of said document, comprising means for projecting two beams of light along adjacent paths at said document, the combined width of said two beams of light being substantially the same as the width of one of the tab stop marks, means for detecting variations in the amount of light from said beams reflected back along said adjacent paths from said document, means responsive to a simultaneous reduction in the amounts of light reflected from both of said beams in response to a tab stop mark positioned opposite said beam-projecting means for producing a tab stop signal, and carriage positioning means responsive to said tab stop signal for positioning said carriage in accordance with said sensed tab stop mark.

4. Apparatus for controlling a typewriter carriage to position different portions of a document supported by said carriage at a printing station, said document being provided with tab stop marks whose positions on said document correspond to the desired tab stop positions, said tab stop marks having a width greater than the width of any other indicia on said document and having a light reflection coefficient which is substantially different from the general background of said document, comprising a light source, a light sensitive element, means for projecting a first portion of the light from said light source to said light sensitive element to provide a bias for reducing the effective sensitivity of said light sensitive element, means for projecting a second portion of the light from said source in a beam toward said document, means for directing light reflected by said document from said beam to said light sensitive element, means for detecting a reduction in the amount of reflected light reaching said light sensitive element to produce a tab stop signal, and carriage positioning means responsive to said tab stop signal for positioning said carriage in accordance with said tab stop marks.

5. Apparatus for controlling a typewriter carriage to position different portions of a document supported by said carriage at a printing station, said document being provided with tab stop marks whose positions on said document correspond to the desired tab stop positions, said tab stop marks having a width greater than the width of any other indicia on said document and having a light reflection coefficient which is substantially different from the general background of said document, comprising a light source, a pair of light sensitive elements, means for projecting a first portion of the light from said light source to said light sensitive elements to provide a bias for reducing the effective sensitivities of said light sensitive elements, means for projecting a second portion of the light from said source in two beams toward said document, means for directing light reflected by said document from said beams to said light sensitive elements, means for detecting a simultaneous variation in the amounts of reflected light reaching said light sensitive elements to produce a tab stop signal and carriage positioning means responsive to said tab stop signal for positioning said carriage in accordance with said tab stop marks.

6. Apparatus for controlling a typewriter carriage to position different portions of a document supported by said carriage at a printing station, said document being provided with tab stop marks whose positions on said document correspond to the desired tab stop positions, said tab stop marks having a width greater than the width of any other indicia on said document and having a light reflection coefficient which is substantially different from the general background of said document, comprising a light source, a pair of light sensitive elements, means for projecting a first portion of the light from said light source to said light sensitive elements to provide a bias for reducing the effective sensitivities of said light sensitive elements, means for projecting a second portion of the light from said source in two beams toward said document, means for directing light reflected by said document from said beams to said light sensitive elements, means for detecting a simultaneous reduction in the amounts of reflected light reaching said light sensitive elements to produce a tab stop signal, and carriage positioning means responsive to said tab stop signal for positioning said carriage in accordance with said tab stop marks.

7. Apparatus for controlling a typewriter carriage to position different portions of a document supported by said carriage at a printing station, said document being provided with tab stop marks whose positions on said document correspond to the desired tab stop positions, said tab stop marks having a width greater than the width of any other indicia on said document and having a light reflection coefficient which is substantially different from the general background of said document, comprising a light source, a pair of light sensitive elements, a light directing structure including a biasing surface for projecting a first portion of the light from said light source to said light sensitive elements to provide a bias for reducing effective sensitivities of said light sensitive elements, said structure including means for projecting a second portion of the light from said source in two beams toward said document and means for directing light reflected by said document from said beams to said light sensitive elements, means for detecting a simultaneous reduction in the amounts of reflected light reaching said light sensitive elements to produce a tap stop signal, and carriage positioning means responsive to said tab stop signal for positioning said carriage in accordance with said tab stop marks.

References Cited in the file of this patent

UNITED STATES PATENTS

| | | |
|---|---|---|
| 2,111,619 | Fleming | Mar. 22, 1938 |
| 2,860,759 | Clark | Nov. 18, 1958 |